Patented July 10, 1951

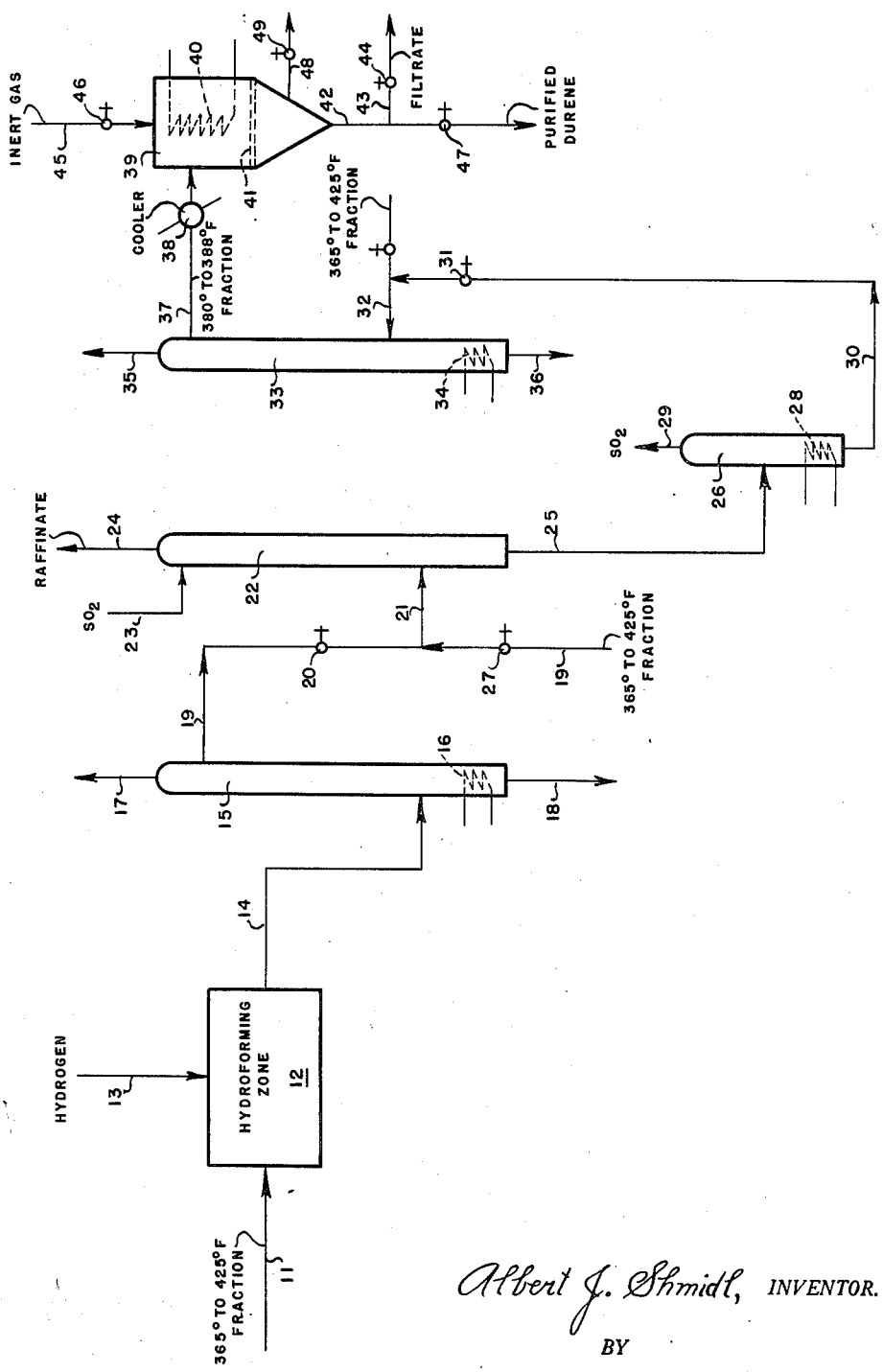

2,560,373

UNITED STATES PATENT OFFICE 2,560,373

RECOVERY AND PURIFICATION OF DURENE

Albert J. Shmidl, Houston, Tex., assignor, by mesne assignments, to Standard Oil Development Company, Elizabeth, N. J., a corporation of Delaware Application March 29, 1948, Serial No. 17,727

2 Claims. (Cl. 260—674)

The present invention is directed to a method for recovering a tetramethyl benzene from a hydrocarbon mixture containing it. More particularly, the invention is directed to the recovery of 1,2,4,5-tetramethyl benzene, commonly called durene, from a hydrocarbon fraction containing the durene.

It has long been known to separate aromatic hydrocarbons from other hydrocarbons in admixture with the aromatic hydrocarbons by purification procedures employing crystallization as one step in the purification. Usually, however, in purifying aromatic hydrocarbons it has been necessary and desirable to dissolve the aromatic hydrocarbon in a dissimilar hydrocarbon to aid in the purification. Thus, for example, a light paraffinic hydrocarbon, such as normal pentane, has been employed in separating aromatic hydrocarbons from their mixtures. When dissimilar hydrocarbons are employed in the purification of aromatic hydrocarbons, it is necessary to separate, recover, and purify both the desirable aromatic and the dissimilar hydrocarbon that was added thereto to aid in the separation and purification thereof. This entails provision of special equipment and costly purification and recovery operational steps.

It is, therefore, an object of the present invention to provide a purification and recovery process for separating a tetramethyl benzene such as durene from its mixtures with other aromatics and hydrocarbons having similar boiling points.

Another object of the present invention is to provide a series of processing steps to which a fraction containing durene is subjected to recover therefrom substantially pure durene.

A still further object of the present invention is to recover from a fraction boiling in the range between 365° and 425° F. and containing a durene concentrate having greater than 90% purity.

The objects of the present invention may be achieved by subjecting a fraction boiling in the gasoline boiling range such as one boiling between 365° and 425° F. and containing durene to distillation to separate a narrow boiling fraction which may then be chilled to separate therefrom durene in a substantially purified form.

Briefly, the present invention involves the distillation of a fraction boiling in the gasoline boiling range to discard components boiling below 380° F. and those boiling above about 388° F. The fraction boiling between 380° and 388° F. is then chilled to a temperature in the range between 0 and 32° F. to cause precipitation of crystals of durene. These crystals may be separated from the supernatant liquid by filtration or decantation and the filtrate or decantate removed. Such a procedure provides a durene of about 80% purity. Higher purities may be obtained by warming the durene crystals to about 85° F. and blowing with an inert gas. A durene concentrate in the range from 90 to 97% purity may be obtained.

In accordance with the practice of the present invention, a crude petroleum fraction containing durene would ordinarily be subjected to fractional distillation to obtain a fraction boiling in the range between 380° to 388° F. However, when employing fractions which are low in durene content, it may be desirable to subject such fractions to a preliminary concentration step which may include solvent extraction with a solvent such as sulfur dioxide. Other solvents such as phenol, furfural, nitrobenzene, and the like, having the ability to separate predominantly aromatic constituents from predominantly paraffinic constituents may be used in lieu of sulfur dioxide, but ordinarily sulfur dioxide will be the preferred solvent. Such a solvent extraction step will be desirable on crude petroleum fractions in which the concentration of durene is very low.

When a cracked naphtha such as a catalytically cracked naphtha containing durene is the feed source for the process of the present invention, it will be desirable to subject a fraction boiling in the range between 365° and 425° F. to a hydroforming operation following which the hydroformed fraction is distilled to discard material boiling below 365° F. and fractions boiling above 425° F. and the fraction boiling in the range between 365° and 425° F. is subjected to solvent extraction to concentrate further the aromatics.

While a fraction boiling between 365° and 425° F. forms a suitable feed stock, narrower boiling fractions containing durene may be employed as the feed to the hydroforming or solvent extraction operation.

It will thus be seen in accordance with the present invention that three different procedures may be used depending on the source of the feed stock which contains durene. In the case where cracked naphtha is the feed stock, it will be desirable to hydroform the fraction, solvent extract the hydroformed fraction, and then distill following which the procedure involving chilling, settling and filtering may be employed.

In the case where the fraction containing the durene is a fraction in which the durene is in low concentration, the distilling, settling, and filtering steps may be preceded by a solvent extraction step whereas in the third and simplest procedure, the crude petroleum fraction containing the durene is distilled, chilled, settled, and filtered to recover the durene concentrate.

The invention will now be described in more detail by reference to the drawing in which the sole figure is a flow diagram of a mode of practicing the invention.

Referring now to the drawing, numeral 11 designates an inlet in which a fraction such as one boiling in the range between 365° and 425° F. and containing durene, olefins, and other hydrocarbons is introduced into a hydroforming zone 12. Hydroforming zone 12 has been shown as a rectangle provided with a hydrogen inlet line 13. It will be understood that although the hydroforming zone 12 is shown as a box in the diagram, it will include all auxiliary equipment necessary for such hydroforming operation. The hydroforming operation is well known to the art, but in general the hydroforming process is characterized by chemical reactions which take place when hydrocarbon oils, particularly hydrocarbons boiling in the gasoline range, are reacted at a temperature in excess of 500° F. in the presence of hydrogen and a reforming catalyst. These reactions involve a net effect of removing hydrogen from the hydrocarbon molecules and when olefins are present hydrogen transfer to the olefins. Although some olefins are formed in the process and are removed with the product, the chemical reactions involved are complex and are generally considered to consist mainly of dehydrogenation and cyclization although other side reactions may and do occur. The catalysts utilized in the hydroforming reaction may be selected from a wide variety of materials. Especially satisfactory catalysts for this reaction comprises major portions of aluminum oxide and minor portions of oxides or sulfides of metals of the IV and V, VI and VIII groups of the periodic system. The oxides and sulfides of vanadium, molybdenum, chromium, tungsten and nickel are particularly effective. The aluminum oxide incorporated in the catalyst may be used in its various forms such as activated alumina, bauxite, aluminum hydroxide, alumina gels and peptized alumina gels. As examples of the type of catalyst found suitable in the hydroforming reactions which may be mentioned are alumina or peptized alumina gels containing from 1 to 20% by weight of certain molybdenum oxides or chromium oxides.

The hydroforming reaction is endothermic and consequently heat must be supplied to the reaction. This may be accomplished by any of the conventional methods which are well known to the art. Although temperatures as low as 500° F. and pressures as low as atmospheric pressures may be employed, I prefer to conduct the hydroforming reaction at a temperature range of about 900° to 950° F. and at pressures of about 180 to 250 pounds per square inch gauge.

Although the hydroforming reaction is essentially a dehydrogenation reaction in which hydrogen is produced, it is well known that the presence of excess hydrogen results in higher yields of desired products and, consequently, in practicing my invention, I introduce hydrogen into the hydroforming zone as shown.

Although not shown in the drawing, the hydroformed product issuing from hydroforming zone 12 by line 14 may be subjected to treatment with sulfuric acid of sufficient strength to remove olefins therefrom which remain in the boiling range of the desired durene fraction; that is to say, if the hydroforming operation does not convert substantially all of the olefinic material boiling in the desired boiling range to material of higher or lower boiling points, it may be desirable to subject the hydroformate to a mild sulfuric acid treatment to remove olefins therefrom. Usually, however, the effluent from hydroforming zone 12 may be routed by line 14 to distillation zone 15 which is provided with a heating means illustrated by coil 16 for adjustment of temperature and pressure. While distillation zone 15 is shown as a single fractionating tower, it will be understood that it may include two or more fractionating towers but for convenience of description, distillation zone 15 is shown as a single fractionating tower. It will be understood that distillation tower 15 will be provided with suitable internal baffling equipment such as bell cap trays, packing, and the like to insure intimate contact between vapors and liquids. Conditions are adjusted in distillation tower 15 to remove as an overhead fraction by line 17 hydrocarbons and gaseous material boiling below 365° F. and heavier material boiling above 425° F. by line 18 while a fraction boiling between 365° and 425° F. may be withdrawn as a side stream by line 19 controlled by valve 20. This fraction may then be routed by line 21 to a solvent extraction zone 22 wherein it is contacted with a solvent selective for aromatics such as liquefied sulfur dioxide which may be introduced by line 23. Conditions are well known for separating aromatics from non-aromatics with liquefied sulfur dioxide so reference to them need not be made here. It will suffice to say that conditions are adjusted in zone 22 to allow obtaining of a raffinate phase and an extract phase. The raffinate phase will include the substantially paraffinic constituents and may be withdrawn from zone 22 by line 24 for recovery of solvent and for further use as may be desired while the extract phase containing the desired durene is withdrawn from zone 22 by line 25 and discharged thereby into a solvent stripping zone 26 for recovery of solvent and the hydrocarbons as will be described further.

When the feed stock is a crude petroleum fraction boiling in the range between 365° and 425° F. and is low in durene content, it may not be necessary to charge it to the hydroforming zone 12. In these instances the durene-containing hydrocarbon fraction may be introduced into the system by opening valve 27 in line 19. Under these conditions, it will be understood that the portion of the system back of valve 20 will be isolated by closing of valve 20 and need not be placed in operation.

Regardless of the source of the feed stock, the extract containing aromatics and durene is subjected to suitable conditions of temperature and pressure to remove the solvent therefrom and to recover the aromatic concentrate. This may be conveniently accomplished by adjusting temperature and pressure conditions by heating means illustrated by coil 28 which causes the sulfur dioxide to be distilled and removed from zone 26 by line 29 while the aromatics substantially free of solvent are withdrawn by line 30 controlled by valve 31 whereby they are discharged into line 32 which feeds them into a highly efficient fractionating zone 33. Fractionating zone 33, like zone 15, may be a series of fractional distillation towers but for convenience is shown as a single distillation tower having at least 50 plates to insure separation of the fractions containing the durene. Conditions are adjusted in zone 33 by heating means illustrated by coil 34 to remove as an overhead fraction by line 35 aromatics boiling below 380° F., aromatics such as prehnitene, which boils at 401° F., and naphthalene, which boils at 420° F., and other aromatics boiling above 388° F. are removed by line 36 while the desired fraction boiling in the range between 380° and 388° F. and including durene is withdrawn by line 37 from whence it is discharged into a cooler 38 and thence into a chilling and filtering zone 39 which is provided with a coil 40 through which may be circulated either a refrigeration fluid or a heating medium. As the durene concentrate boiling in the range between 380° and 388° F. flows through cooler 38 into zone 39 its temperature is reduced to a temperature in the range between 0 and 32° F. The chilling period may be conducted over a period of 5 hours or more. Therefore, in order to make the process continuous, it may be necessary to provide in the system a plurality of chilling vessels 39. However, for purpose of simplification of the description, only a single vessel 39 is shown and it is understood that flow through line 37 has been interrupted. As the durene concentrate is chilled over substantially a five-hour period to a temperature in the range between 0° and 32° F., the flakes or crystals of durene settle to the bottom of the vessel 39 onto a filtering medium 41 while the supernatant liquid flows through the filtering medium and outwardly from zone 39 by line 42 and line 43 controlled by valve 44. After substantially all the filtrate has been removed, the filter cake on filtering medium 41 may be blown dry with an inert gas which is introduced by line 45 controlled by valve 46. This gas may be at the temperature of the durene crystals on filtering medium 41 or it may be slightly warmer to aid in the freeing of the crystals of other aromatic hydrocarbons from the durene and which may have been crystallized or occluded therewith. The warming of the gas may be accomplished by terminating the flow of cooling fluid through coil 40 and substituting therefor a heating medium at a slightly elevated temperature sufficient to warm the crystals of durene to about 85° F. to separate a second filtrate which similarly may be withdrawn by line 43 controlled by valve 44. After this step has been completed, valve 44 is closed and the durene crystals are melted by flowing additional heating fluid through coil 40 and passing inert gas therethrough, if desired, to cause melting and liquefying of durene crystals to allow its recovery from filtering medium 41. The melted durene may then be withdrawn by opening valve 47 in line 42.

While the inert gas may conveniently be removed during the blowing operation through line 43 with the filtrate, it may be desirable to withdraw the inert gas separately and to this end a separate line 48 controlled by valve 49 is provided. Usually, however, it may not be necessary to employ the separate line to withdraw the gas.

It will be seen from the foregoing description taken with the drawing that three separate modes of practicing my invention are possible depending on the source of the feed stock.

The invention will now be further illustrated by reference to the following example. A highly aromatic fraction which was obtained by hydroforming and solvent extraction of a crude petroleum fraction and containing 95 to 98% aromatics including durene was fractionated carefully to obtain a fraction boiling in the range between 380° to 388° F. This latter fraction was then chilled to 32° F. to obtain a 25% yield of 80% purity durene crystals. The 80% concentrate was further purified by warming the crystals slightly and filtering dry. When the crystals were warmed to 85° F. a durene fraction of from 90% to 97% purity was obtained. Higher purities may be obtained by recirculating the purified fraction through the system.

As another example, a catalytically cracked naphtha containing durene was fractionated to obtain a fraction boiling in the range between 380° and 390° F. This fraction contained only 9.6% durene and 13.2% by volume of isodurene. The fraction containing these percentages of tetramethyl benzenes was then solvent extracted with successive 25, 50 and 100 volume per cent treats of sulfur dioxide at −40° F. A 39% yield of extract was obtained that contained 18% durene and 39% isodurene. This latter fraction may be chilled to a temperature in the range given to recover a durene concentrate.

The nature and objects of the present invention having been completely described and illustrated, what I wish to claim as new and useful and to secure by Letters Patent is:

1. A method for recovering durene from a hydrocarbon fraction containing at least 18% durene and boiling in the range between 380° and 390° F. which comprises chilling the durene-containing fraction to a temperature in the range between 0 and 32° F. to form a crystalline mass containing durene, separating the durene containing crystals from said chilled fraction, warming said separated crystals to a temperature of the order of 85° F. to cause liquefaction of a portion of said crystals, drying said durene crystals by removing said liquefied portion, and recovering substantially pure durene from said crystals.

2. A method for recovering durene from a hydrocarbon fraction containing at least 18% durene and boiling in the range between 380° and 388° F. which comprises chilling said fraction to 32° F. to form a crystalline mass containing durene having a purity of approximately 80%, separating the crystalline mass from said chilled fraction, warming the crystalline mass to about 85° F. to cause liquefaction of a portion of said mass, withdrawing said liquefied portion, and recovering durene from said warmed crystalline mass having a purity in the range from 90% to 97% by volume.

ALBERT J. SHMIDL.

REFERENCES CITED

The following references are of record in the file of this patent:

UNITED STATES PATENTS

| Number | Name | Date |
|---|---|---|
| 1,481,197 | Gould | Jan. 15, 1924 |
| 1,940,065 | Spannagel et al. | Dec. 19, 1933 |
| 2,024,476 | Rutherford | Dec. 17, 1935 |
| 2,167,339 | Sweeney | July 25, 1939 |
| 2,249,337 | Visser et al. | July 15, 1941 |
| 2,330,054 | Hibshman | Sept. 21, 1943 |
| 2,413,674 | Weir | Dec. 31, 1946 |
| 2,424,841 | Nickels | July 29, 1947 |
| 2,435,792 | McArdle et al. | Feb. 10, 1948 |

FOREIGN PATENTS

| Number | Country | Date |
|---|---|---|
| 670,474 | Germany | Oct. 5, 1933 |

OTHER REFERENCES

Liebig's Annalen der Chemie, vol. 234, page 98 (1886) (1 page only; complete article includes pages 89–115).